(12) United States Patent
Huang

(10) Patent No.: US 8,305,543 B2
(45) Date of Patent: Nov. 6, 2012

(54) SUBSTRATE FOR LIQUID CRYSTAL DISPLAY AND SEALANTS AT OPENING REGION WITH DIFFERENT HARDNESS, MANUFACTURING METHOD THEREOF AND PANEL

(75) Inventor: Dongsheng Huang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 527 days.

(21) Appl. No.: 12/533,176

(22) Filed: Jul. 31, 2009

(65) Prior Publication Data
US 2010/0033667 A1   Feb. 11, 2010

(30) Foreign Application Priority Data

Aug. 7, 2008   (CN) .............. 2008 2 0109752 U
Aug. 15, 2008  (CN) .............. 2008 1 0117938

(51) Int. Cl.
*G02F 1/1339* (2006.01)
*G02F 1/1341* (2006.01)
*H01J 9/32* (2006.01)

(52) U.S. Cl. ........ 349/153; 349/154; 349/155; 349/189; 349/190; 445/25

(58) Field of Classification Search .......... 349/153–155, 349/189–190; 445/25
See application file for complete search history.

(56) References Cited

U.S. PATENT DOCUMENTS

| | | | | |
|---|---|---|---|---|
| 6,078,379 A * | 6/2000 | Nagae et al. | .................. | 349/155 |
| 2001/0012088 A1* | 8/2001 | Jeong | ............................. | 349/153 |
| 2003/0025868 A1* | 2/2003 | Hiroshima et al. | ........... | 349/156 |
| 2003/0197829 A1* | 10/2003 | Liang | ............................. | 349/187 |
| 2007/0211203 A1* | 9/2007 | Niwa et al. | ..................... | 349/154 |
| 2009/0040452 A1* | 2/2009 | Kobayashi et al. | ........... | 349/190 |

FOREIGN PATENT DOCUMENTS

| | | |
|---|---|---|
| CN | 201032509 Y | 3/2008 |
| JP | 04097132 A * | 3/1992 |

* cited by examiner

*Primary Examiner* — Hoan C Nguyen
(74) *Attorney, Agent, or Firm* — Ladas & Parry LLP

(57) ABSTRACT

An assembled panel is provided in the present invention, the panel comprises substrate for liquid crystal display. The substrate comprises a base substrate comprising at least one individual panel region, a subsidiary sealant member provided on the periphery of the individual panel region, at least one opening region provided on the subsidiary sealant member, and a buffer provided on the base substrate between the opening region and the individual panel region and corresponding to the opening region.

9 Claims, 13 Drawing Sheets

SUBSTRATE FOR LIQUID CRYSTAL DISPLAY AND SEALANTS AT OPENING REGION WITH DIFFERENT HARDNESS, MANUFACTURING METHOD THEREOF AND PANEL

BACKGROUND OF THE INVENTION

Embodiments of the present invention relate to a substrate for liquid crystal display, a manufacturing method thereof and an assembled panel.

Recently, liquid crystal displays (LCDs) have been widely applied to personal digital assistants (PDAs), play station portables (PSPs), global positioning systems (GPSs) and the like. Among various kinds of liquid crystal displays, thin film transistor liquid crystal displays (TFT-LCDs) have prevailed in the market of flat panel displays due to the advantages of low power consumption and free of radiation and the like.

The display panel of a TFT-LCD comprises a thin film transistor (TFT) array substrate, a color filter substrate, and a liquid crystal layer interposed therebetween. The principle based on which a TFT-LCD displays an image is that the liquid crystal molecules in the liquid crystal layer can be rotated with the intensity of the electric field applied thereon by the voltage applied from the driving circuit and accordingly the alignment direction of the liquid crystal molecules are changed so that the amount of light transmitted through the liquid crystal layer is changed.

A conventional process of manufacturing a TFT-LCD panel generally comprises a TFT process, a color filter process, a cell process and a module process. The cell process can comprise four steps as follows: applying an alignment film and curing the alignment film on the surfaces of a TFT array substrate and a color filter substrate; rubbing the alignment films and forming grooves along a certain direction on the surfaces of the alignment films so that liquid crystal molecules can be pre-aligned along the direction; assembling the TFT array substrate and the color filter substrate with a sealant member and curing the sealant member; and performing a cutting process on the assembled substrates to form individual panels.

In assembling, firstly liquid crystal material is dropped and sealant is coated to form a sealant member comprising a subsidiary sealant member and a primary sealant member, and then the TFT array substrate and the color filter substrate are bonded together. As shown in FIG. 1, a plurality of individual panels 14 are obtained after assembling the TFT array substrate and the color filter substrate. The individual panel 14 comprises an individual panel region of the TFT array substrate, an individual panel region of the color filter substrate, and a liquid crystal layer held between the two individual panel regions.

The individual panel regions of the TFT array substrate and the individual panel regions of the color filter substrate face each other and are equal in number. During the assembling process, liquid crystal material is firstly dropped onto the individual panel regions of the TFT array substrate or the individual panel regions of the color filter substrate, the primary sealant is applied along the edges of the individual panel regions of the TFT array substrate or the color filter substrate, which has not the liquid crystal material dropped thereon, the subsidiary sealant is applied on the periphery of the individual panel regions, and then the TFT array substrate and the color filter substrate are bonded together and the sealants are cured through light irradiation or thermal treatment.

As shown in FIG. 2, gate lines, data lines, thin film transistors 7 and other components are provided in the individual panel regions of the TFT array substrate, and a black matrix 9, a color filter film 8 and other components are provided in the individual panel regions of the color filter substrate.

The panel obtained by assembling the TFT array substrate and the color filter substrate is cut into a plurality of individual liquid crystal display panels.

Because the space between the TFT array substrate and the color filter substrate is vacuumed when the TFT array substrate is bonded with the color filter substrate under a vacuum situation and pressure in the space is quite low, the primary sealant member 2 may be easily attacked by the airflow entering into the regions between the subsidiary sealant member 15 and the primary sealant member 2 through the opening regions 12 of the subsidiary sealant member 15 after the panel is exposed to the atmosphere. Therefore, the primary sealant member 2 is damaged or broken and the display quality can be degraded due to the produced bubbles.

SUMMARY OF THE INVENTION

A substrate for liquid crystal display is provided in an embodiment of the invention. The substrate comprises a base substrate comprising at least one individual panel region, a subsidiary sealant member provided on the periphery of the individual panel region, at least one opening region provided on the subsidiary sealant member, and a buffer provided on the base substrate between the opening region and the individual panel region and corresponding to the opening region.

A method of manufacturing a substrate for liquid crystal display is further provided in another amendment of the invention. The method comprises forming at least one individual panel region on a base substrate; forming a subsidiary sealant member on the periphery of the individual panel region and providing at least one opening region on the subsidiary sealant member; and forming a buffer corresponding to the opening region on the substrate between the opening region and each of the individual panel region.

An assembled panel is further provided in further another embodiment of the invention. The panel comprises a thin film transistor array substrate comprising a thin film transistor array substrate comprising at least one individual panel region; a color filter substrate comprising at least one individual panel region; a liquid crystal layer provided between the individual panel region of the thin film transistor array substrate and the individual panel region of the color filter substrate; a subsidiary sealant member provided on the periphery of the individual panel region of the thin film transistor array substrate and that of the individual panel region of the color filter substrate and provided with at least one opening region; and a buffer provided on the thin film transistor array substrate or on the color filter substrate and corresponding to the opening region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Figure 1:
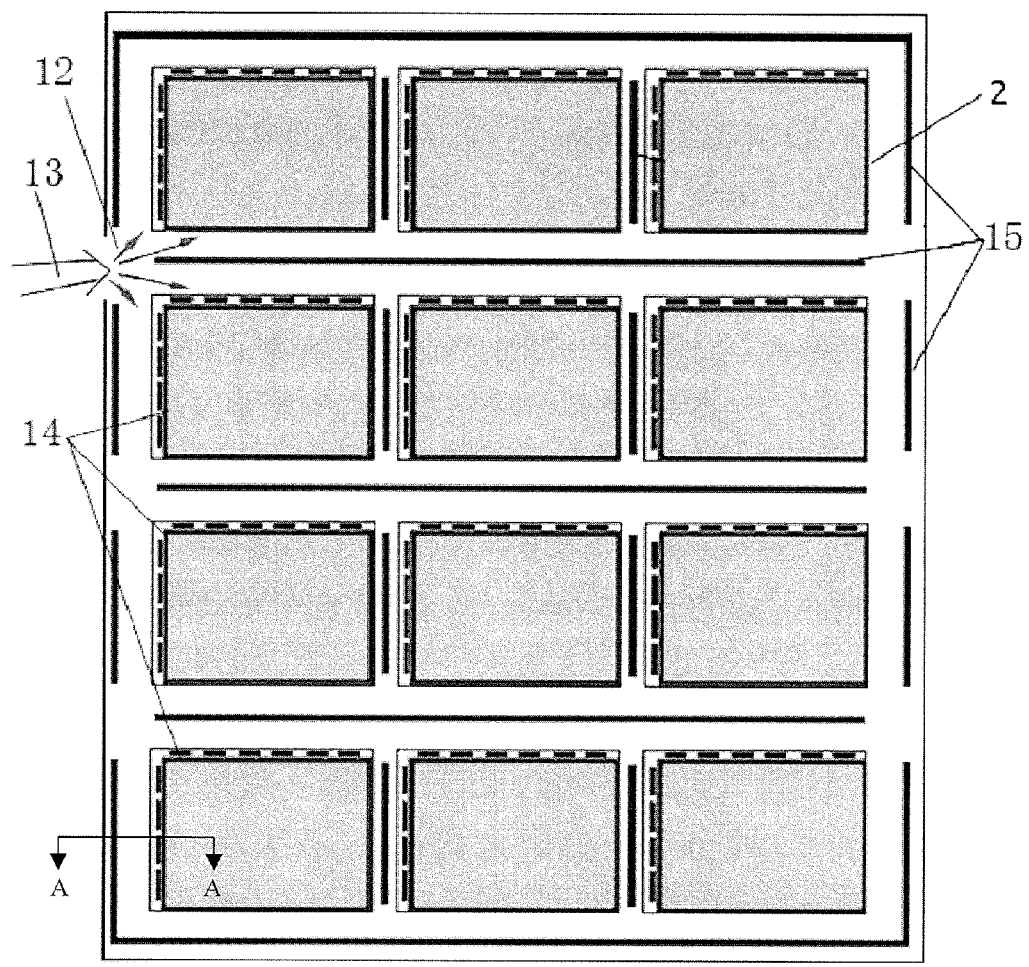
FIG. 1 is a schematic view showing a conventional panel obtained by assembling a TFT array substrate and a color filter substrate.
Figure 2:
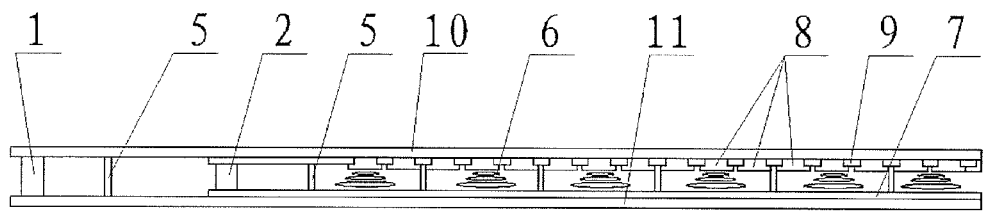
FIG. 2 is a sectional view taken along a line A-A in FIG. 1.

The embodiments of the present invention will be described in detail hereinafter in conjunction with the drawings.

First Embodiment

A substrate for liquid crystal display and a manufacturing method thereof are provided in the first embodiment of the invention to reduce the time spent in the assembling process and improve the efficiency of the cell process.

The substrate for liquid crystal display in the present embodiment comprises a base substrate which comprises at least one individual panel region. A subsidiary sealant member which is formed of a material different form that of the primary sealant member is provided on the periphery of the individual panel region. At least one opening region is provided on the subsidiary sealant member. Specifically, the subsidiary sealant member is used to maintain the cell thickness between two substrates after the two substrates are bonded together, and the opening region provided on the subsidiary sealant member is helpful to air convection so that the pressure inside the panel obtained by assembling two substrates is close to or equal to that of the atmospheric environment.

Spacers may be further provided on the substrate and formed of the same material as that of the subsidiary sealant member. The spacers are mainly used to maintain the cell thickness after two substrates (i.e., a color filter substrate and a TFT array substrate) are bonded together. Since the subsidiary sealant member and the spacers are formed of the same material, they can be manufactured in a same process and thus the manufacturing efficiency can be improved. In addition, the buffer can be formed of the same material as that of the subsidiary sealant in the present embodiment, and thus the subsidiary sealant, the spacers and the buffer can be manufactured in a same process (i.e., the TFT process or the color filter process) and the manufacturing efficiency can be further improved.

The buffer is provided on the substrate between the opening region and the individual panel region and corresponds to the opening region. By providing the buffer corresponding to the opening regions of the subsidiary sealant member, the airflows entering through the opening regions of the subsidiary sealant member after the panel, which has been obtained by assembling the color filter substrate and the TFT array substrate under a vacuum situation, is exposed to the atmosphere can be buffered, and thus the impact force of the airflows to the primary sealant member is reduced. Therefore, the degraded display quality due to bubbles resulting from the damage or breakage of the primary sealant by the impact force of the airflow is effectively prevented and the yield of the liquid crystal display is improved.

The method of manufacturing a substrate for liquid crystal display in the present embodiment of the invention comprises the following steps:

forming at least one individual panel region on a base substrate; and providing a subsidiary sealant member on the periphery of each individual panel region and providing at least one opening region on the subsidiary sealant member.

Since the subsidiary sealant member with the at least one opening region is provided on the periphery of the individual panel region, such member can be used to maintain the cell thickness after two substrates are boned together. In addition, the subsidiary sealant member can be manufactured in the process of manufacturing the substrate for liquid crystal display (i.e., the TFT process or the color filter process), and thus the time spent in the assembling process is reduced and the efficiency of the cell process is improved. Therefore, the problem in the conventional panel that the subsidiary sealant member is required to be applied prior to the assembling of the color filter substrate and the TFT array substrate and thus the time spent in the assembling process is increased can be solved.

A color filter substrate and a manufacturing method thereof will be described hereinafter as examples of the embodiment.

Figure 3:
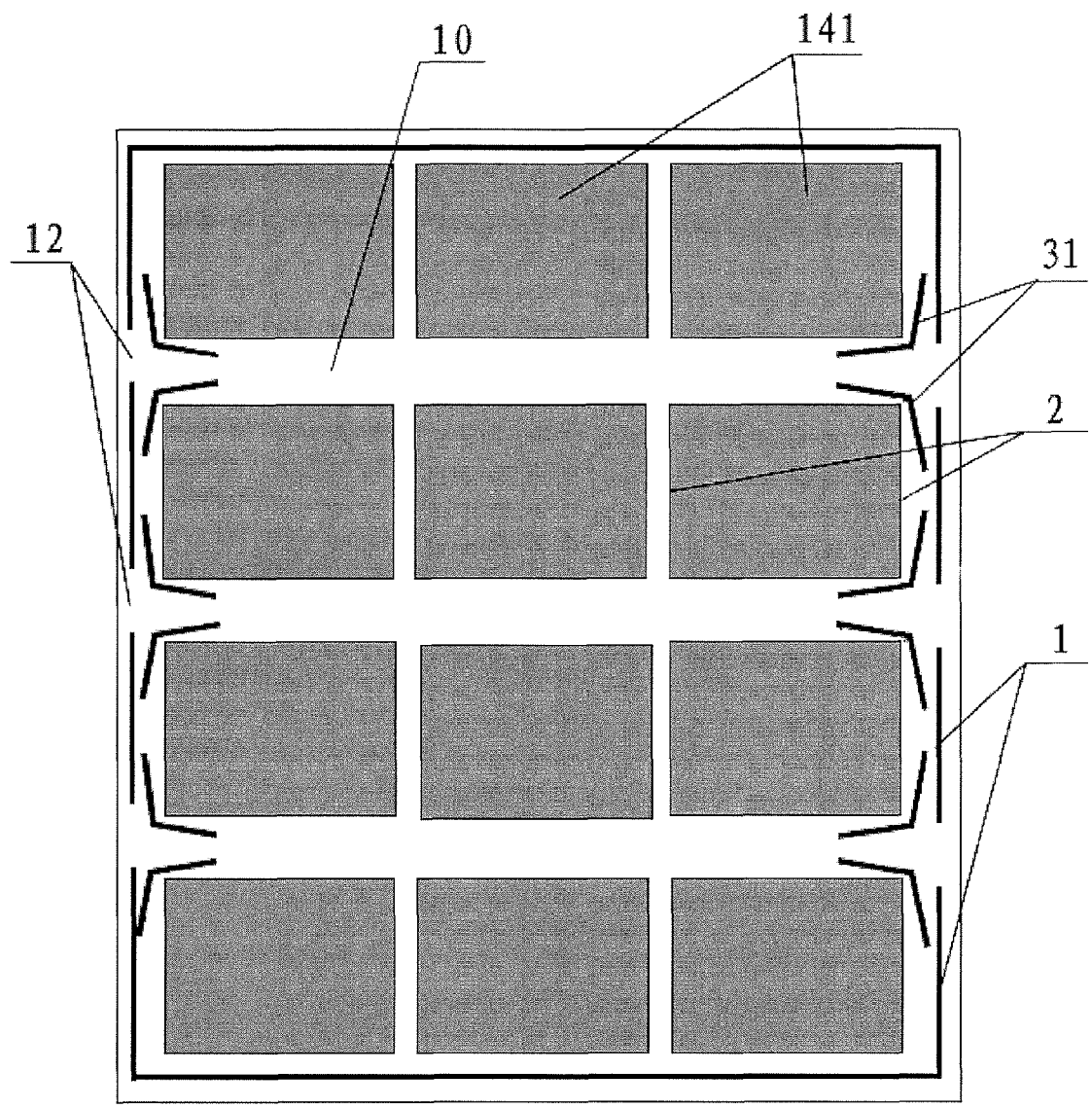
FIG. 3 is a schematic view showing a color filter substrate employed as a substrate for liquid crystal display according to a first embodiment of the present invention.
Figure 4:
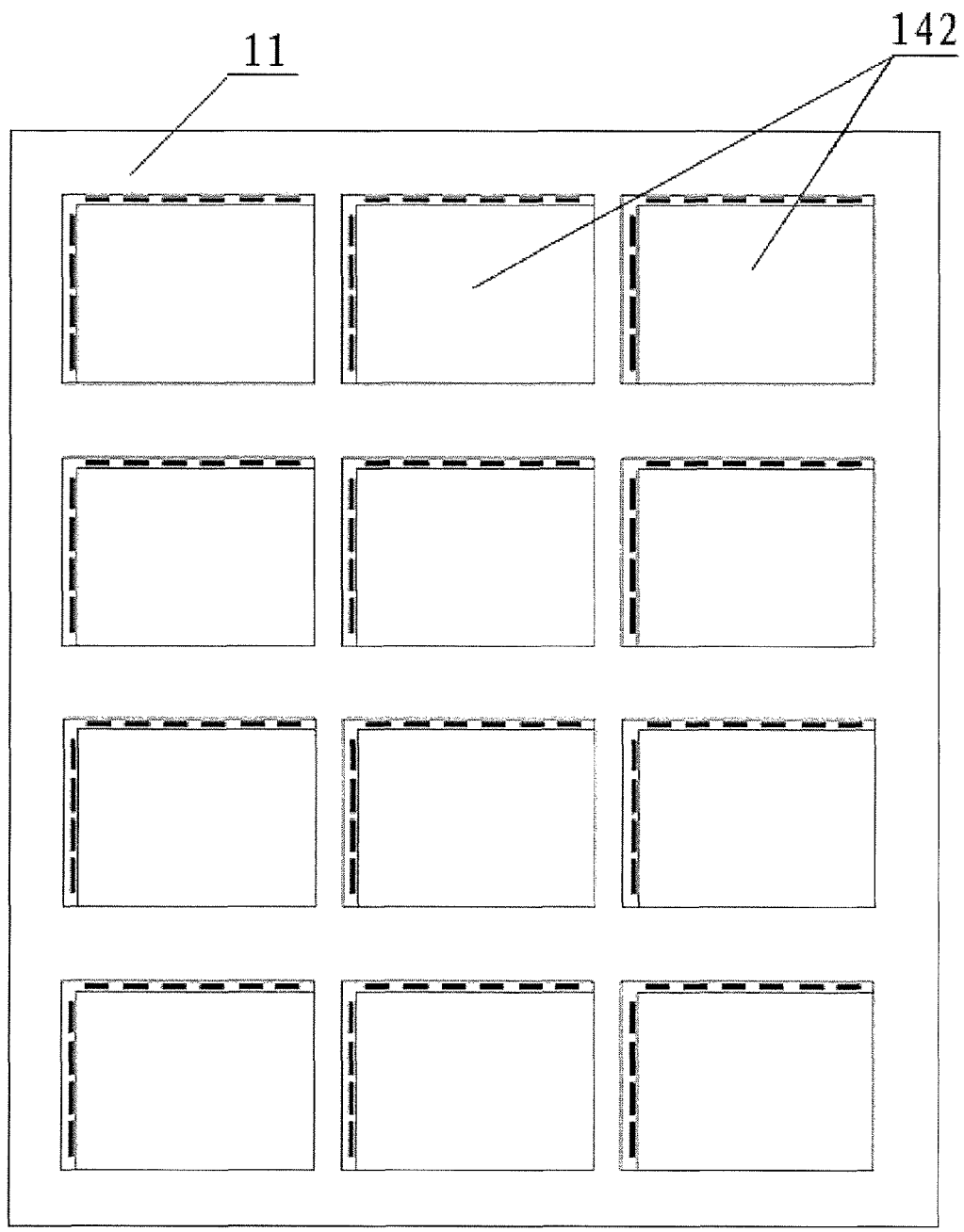
FIG. 4 is a schematic view showing a TFT array substrate which is to be bonded with the color filter substrate shown in FIG. 3.

As shown in FIG. 3, the color filter substrate 10 in the present embodiment comprises at least one individual panel region 141, a primary sealant member 2 provided along the edges of the individual panel region 141, a subsidiary sealant member 1 provided on the periphery of the individual panel region 141, and at least one buffer 31. The subsidiary sealant member 1 has at least one opening region 12. The buffer 31 is provided on the substrate and corresponds to the opening region 12 of the subsidiary sealant member 1. In addition, a black matrix, a color filter film for example forming the color filters of the primary colors red, green and blue, spacers provided on the black matrix, a common electrode, an alignment film and the like are provided on the individual panel region 141. The spacers may also be provided on the TFT array substrate 11 shown in FIG. 4.

Figure 7:
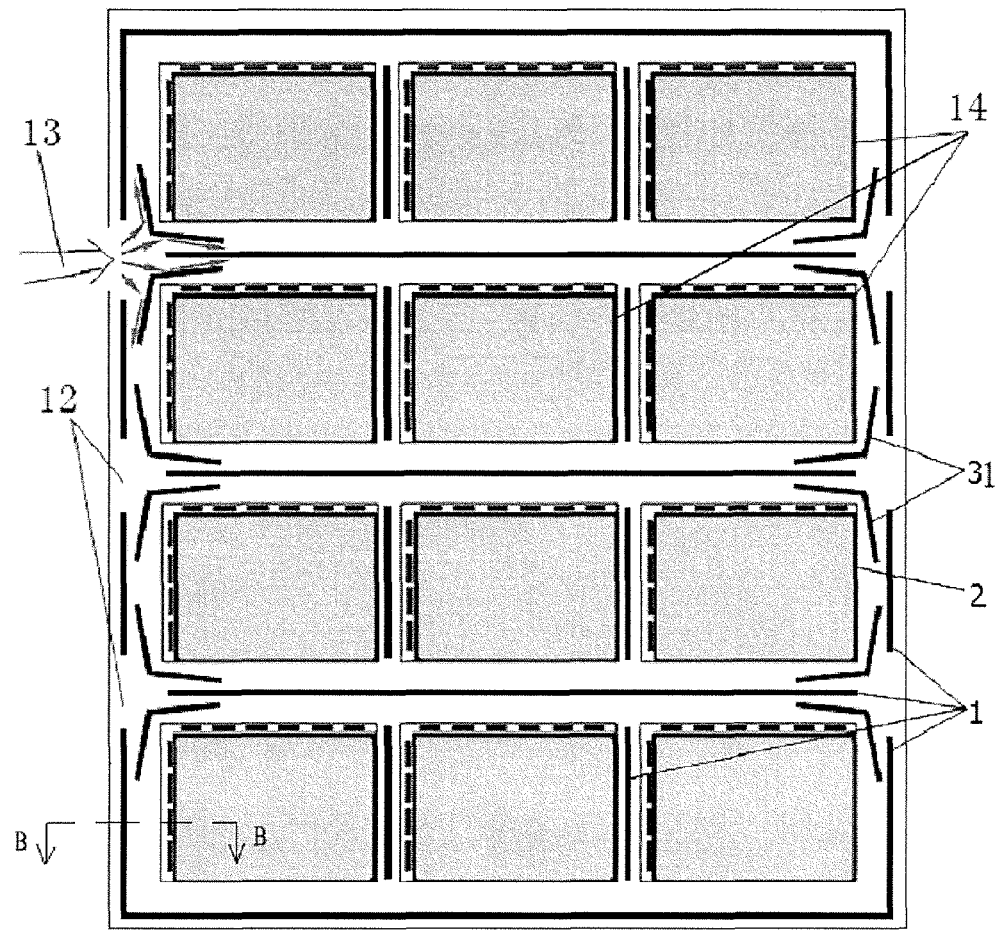
FIG. 7 is a schematic view showing a panel for liquid crystal display after assembling.

The buffer 31 is provided on the substrate between the opening region 12 of the subsidiary sealant member 1 and each individual panel region 141 and corresponds to the opening region 12. The buffer 31 is formed in a strip form and the lateral size thereof is larger than the size of the opening region 12. Furthermore, the buffer 31 is formed in the form of one of a curve line, a fold line, a straight line and any combination thereof. In addition, many other shapes (for example, the shapes of a corner, a semicircle, a parabola and the like) may be employed to form the buffer 31 as long as the airflow entering through the opening region 12 can be buffered. Specifically, with the buffer 31 with the shape of a fold line, the peak of the angle rightly faces the opening region 12, and thus the airflow entering through the opening region 12 can be effectively blocked and buffered as shown in FIG. 7. Furthermore, the subsidiary sealant member 1 and the spacers 5 may be formed of the same material.

In addition, the subsidiary sealant member 1 or the spacers 5 or both of them may be formed on the TFT array substrate 11 that is to be bonded with the color filter substrate 10.

In the present embodiment, the subsidiary sealant member 1 may be formed of the same material (for example, a photosensitive resin) as that of the spacers 5, and alternatively it may be formed of the material different from that of the spacers 5 and preferably formed of the material with a hardness larger than that of the primary sealant member 2. Since the hardness and mechanical strength of the buffer 31 is larger than that of the primary sealant member 2, the airflow entering through the opening region 12 can be more reliably blocked and buffered as shown in FIG. 7.

The buffer 31 in the present embodiment may be formed in a form of one of a curve line, a fold line, a straight line and any combination thereof and preferably formed as a fold line with an obtuse angle as shown in FIG. 3 and the peak of the obtuse angle rightly faces the opening region 12. Therefore, thus the airflows 13 entering through the opening region 12 even flow to the both sides of the buffer 31 as shown in FIG. 7, and thus the impact force of the airflows 13 is greatly reduced, and the degraded display quality due to bubbles resulting from the damage or breakage of the sealant by the impact force of the airflow is effectively prevented.

Figure 8:
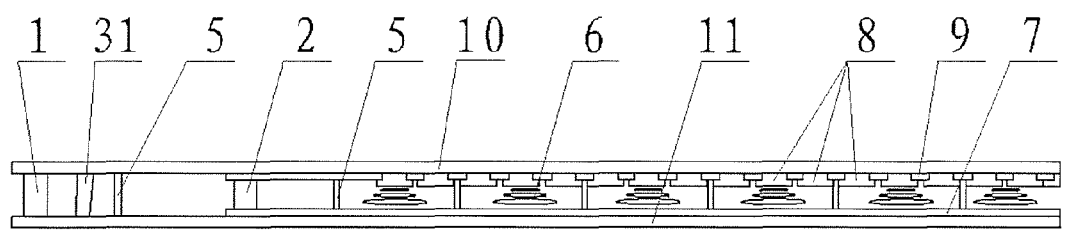
FIG. 8 is a sectional view taken along a line B-B in FIG. 7.

As shown in FIG. 3 and FIG. 8, a method of manufacturing the color filter substrate comprises the following steps.

S1 of providing a black matrix 9, a color filter film 8, and a common electrode on each individual panel region on a substrate.

S2 of providing spacers 5 on the black matrix 9 and at the same time providing a subsidiary sealant member 1, the spacers 5 and a buffer 31 on the substrate after the step S1.

The material layer for the spacers can be deposited on the substrate after the step S1 and the spacers 5, the subsidiary sealant member 1 and the buffer 31 can be formed of the same patterning process. In the relevant field, a patterning process generally comprises applying photoresist, using a mask to expose and develop the photoresist to form a pattern, etching an underlying layer with the pattern, removing the remaining photoresist pattern, and the like.

The subsidiary sealant member 1 is formed on the periphery of each individual panel region 141 and at least one opening region 12 is provided on the subsidiary sealant member 1. The spacers 5 are formed on the black matrix 9 and on the substrate between the subsidiary sealant member 1 and each individual panel region 141. The buffer 31 is formed on the substrate between the opening region 12 and the individual panel region 141 and corresponds to the opening region 12. The buffer 31 is formed in a strip form and the lateral size thereof is larger than the size of the opening regions 12. The buffer 31 is formed in a form of one of a curve line, a fold line, a straight line and any combination thereof and in the present embodiment preferably formed as a fold line with an obtuse angle as shown in FIG. 3, and the peak of the obtuse angle rightly faces the opening region 12;

The width at the bottom of the buffer 31 is about $1/20 \sim 1/3$ of the distance between the subsidiary sealant member 1 and the primary sealant member 2, and the profile of the top of the buffer 31 is shaped as a circular arc. As shown in FIG. 8, the contact area between the buffer 31 with a top of a circular arc shape and the TFT array substrate 11 after boding is reduced and thus the uniformity of the cell thickness can be more easily maintained.

S3 of forming an alignment film on the substrate after the step S2.

S4 of forming a primary sealant member 2 along the edges of the individual panel region 141 on the substrate after the step S3 to surround the individual panel region 141, so that the liquid crystal material 6 dropped onto the individual panel region 141 in the subsequent process is prevented from overflowing or being contaminated.

In addition, the primary sealant member 2 in the present embodiment may be formed on the color filter substrate or on the TFT array substrate to be bonded with the color filter substrate, and the spacers 5 and the subsidiary sealant member 1 may also be formed on the TFT array substrate 1.

A TFT array substrate and a manufacturing method thereof will be described hereinafter as another example.

Figure 5:
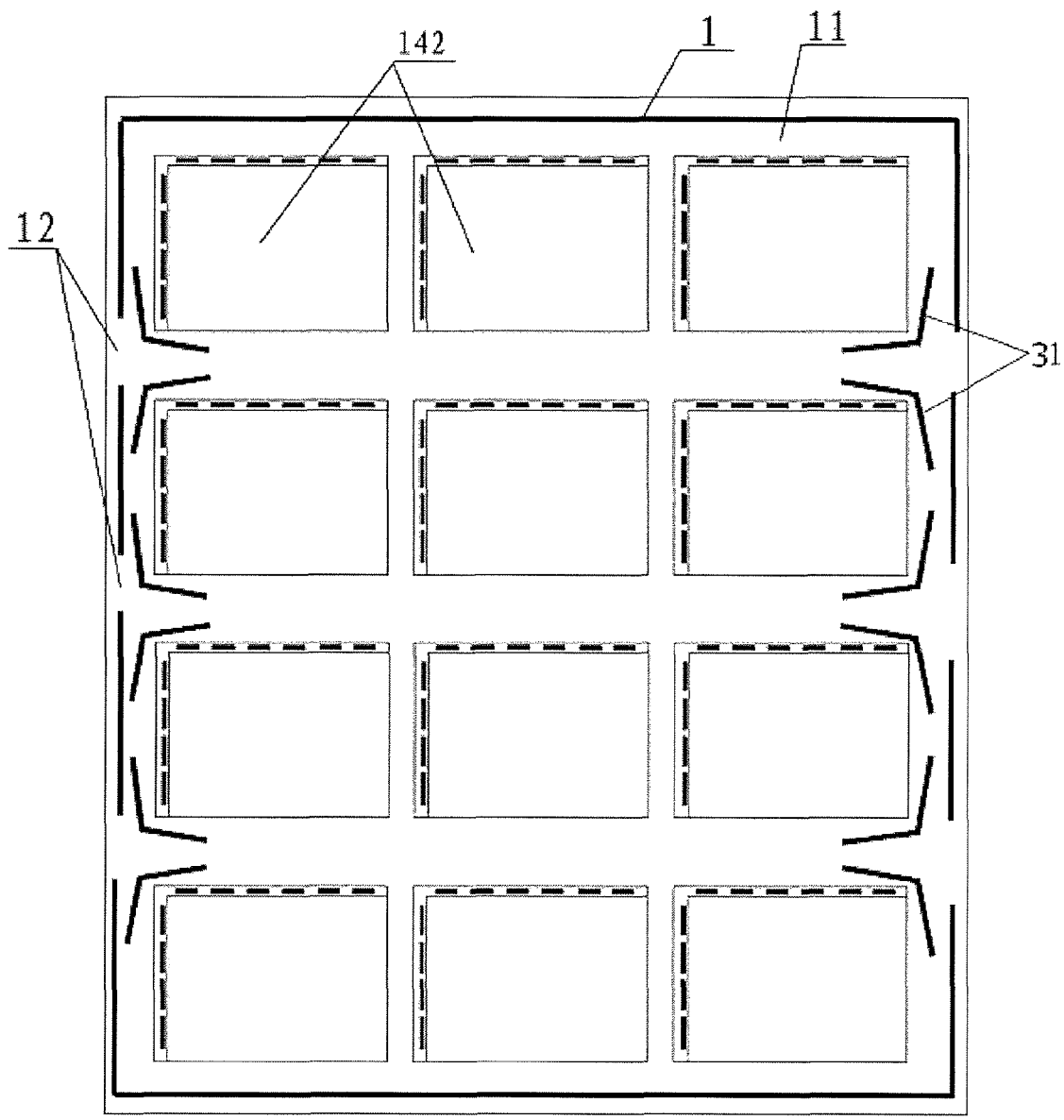
FIG. 5 is a schematic view showing a TFT array substrate employed as a substrate for liquid crystal display according to the first embodiment of the present invention.

As shown in FIG. 5, the TFT array substrate 11 in the present embodiment comprises at least one individual panel region 142, a primary sealant member 2 provided on the edges of the individual panel region 142, a subsidiary sealant member 1 provided on the periphery of the individual panel region 142 and at least one buffer 31. The subsidiary sealant member 1 has at least one opening region 12. The buffer 31 is provided on the substrate and corresponds to the opening region 12 of the subsidiary sealant member 1.

Figure 6:
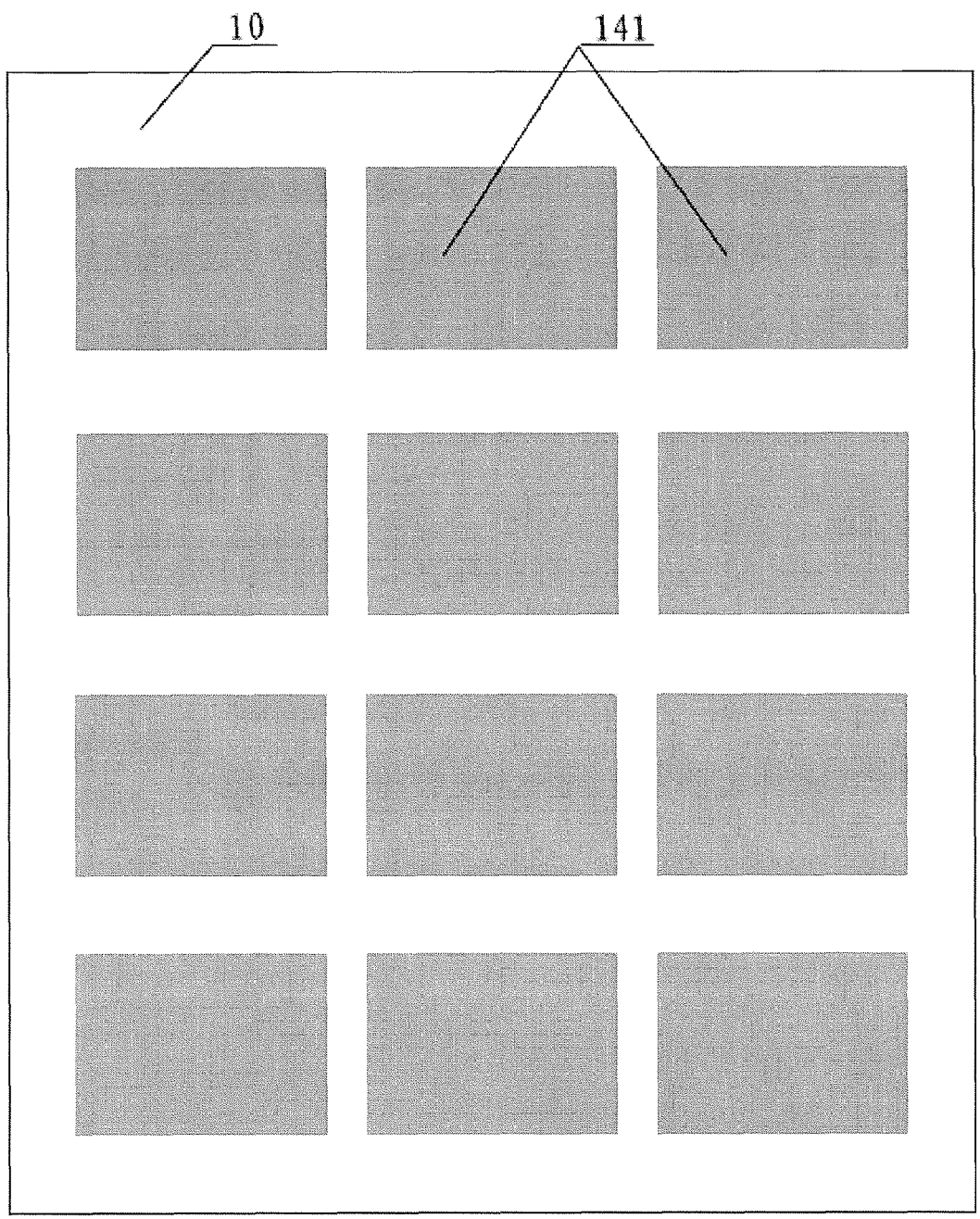
FIG. 6 is a schematic view showing a color filter substrate which is to be bonded with the TFT array substrate shown in FIG. 5.

In addition, gate lines, a gate insulating layer, data lines, thin film transistors 7, a passivation layer, an alignment film, spacers and the like are provided on the individual panel region 142. The spacers may also be provided on the color filter substrate 10. Modifications and variations of the above gate lines, the gate insulating layer, data lines, thin film transistors, the passivation layer, the alignment film and spacers may occur, and for example, the spacers may be formed on the color filter substrate 10 as shown in FIG. 6. But these modifications and variations are still in the spirit of the invention.

The buffer 31 is formed on the substrate between the opening region 12 and each individual panel region 142 and corresponds to the opening region 142. The primary sealant member 2 is formed on the edges of each individual panel region 142. The lateral size of the buffer 31 is larger than the size of the opening regions 12. The buffer 31, the subsidiary sealant member 1 and the spacers are formed of a same material. The buffer 31 is formed as one of a curve line, a fold line, a straight line and any combination thereof.

In the present embodiment, the primary sealant member 2 may be formed on the thin film transistor substrate or on the color filter substrate 10 to be bonded with the TFT array substrate. The spacers 5 may also be formed on the color filter substrate 10.

An exemplary method of manufacturing the TFT array substrate in the present embodiment comprises the following steps.

A1 of forming gate electrodes, a gate insulating layer, data lines and thin film transistors on each individual panel region on a base substrate of glass.

A2 of forming a passivation layer on the gate electrodes, the gate insulating layer, the data lines and the thin film transistors and forming via holes or trenches in the passivation layer.

A3 of forming a transparent pixel electrode on the passivation layer so that the transparent pixel electrodes are formed and connected with the drain electrodes of the thin film transistors through the via holes or trenches in the passivation layer.

A4 of forming spacers shown in FIG. 8 on the passivation layer and at the same time forming a subsidiary sealant member 1 and a buffer 31 on the substrate.

Specifically, a material layer for the spacers is formed on the substrate after the step A3, and the spacers 5 shown in FIG. 8 are formed on the passivation layer above data lines by the patterning process. At the same time, the subsidiary sealant member 1 and the buffer 31 are formed on the substrate. The subsidiary sealant member 1 is formed on the periphery of each individual panel region 142 as shown in FIG. 5 and at least one opening region 12 is provided on the subsidiary sealant member 1. The spacers 5 may be further formed on the substrate between the subsidiary sealant member 1 and the individual panel region 142.

The buffer 31 is formed on the substrate between the opening region 12 and the individual panel region 142 and corresponds to the opening region 12. The width at the bottom of the buffer 31 is about $1/20$~$1/3$ of the distance between the subsidiary sealant member 1 and the primary sealant member 2, and the profile of the top of the buffer 31 is shaped as a circular arc.

A5 of forming an alignment film on the spacers on the substrate and on the individual panel region 142 after the step A4.

A6 of forming a primary sealant member 2 shown in FIG. 5 on the edges of the individual panel region 142 on the substrate after the step A5 to surround the individual panel region 142, so that the liquid crystal material 6 in FIG. 8 dropped onto the individual panel region 142 in the subsequent process is prevented from overflowing or being contaminated.

Second Embodiment

An assembled panel is provided in a second embodiment of the present invention. The assembled panel can be used to manufacture liquid crystal displays with a high yield.

Figure 9:
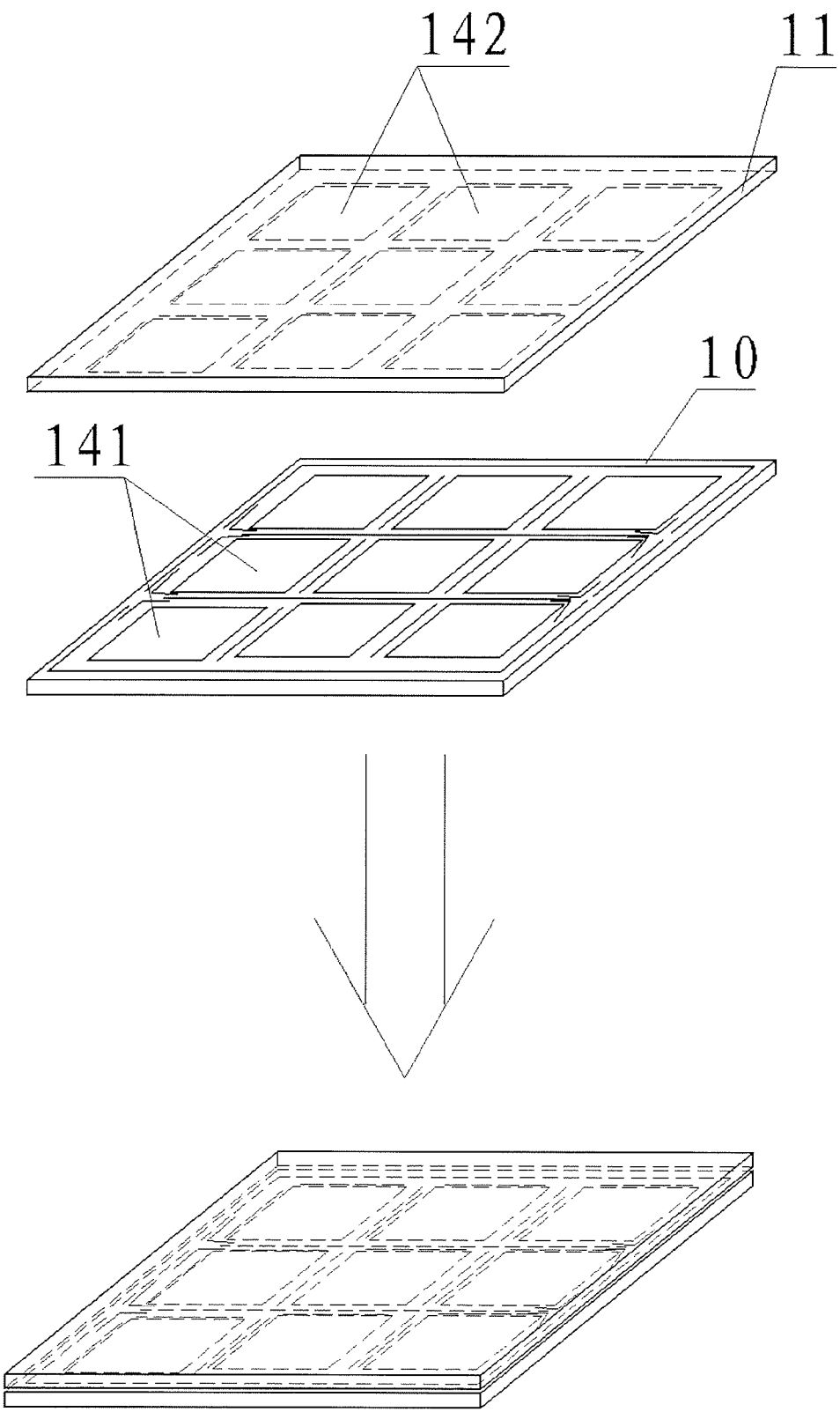
FIG. 9 is a schematic view showing a procedure of assembling a color filter substrate provided with a buffer and a TFT array substrate according to a second embodiment of the present invention.
Figure 10:
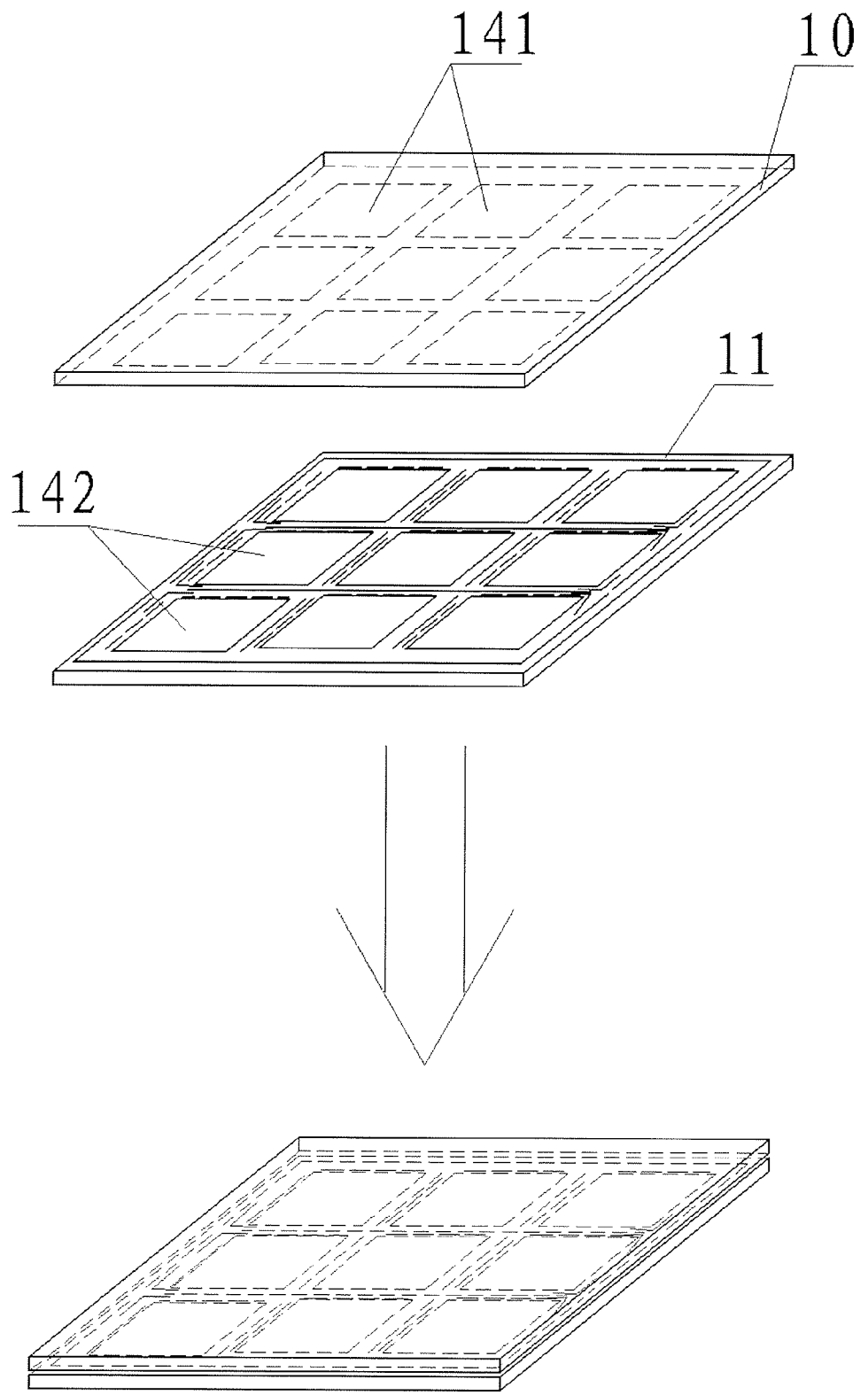
FIG. 10 is a schematic view showing a procedure of assembling a TFT array substrate provided with a buffer and a color filter substrate according to the second embodiment of the present invention.
Figure 11:
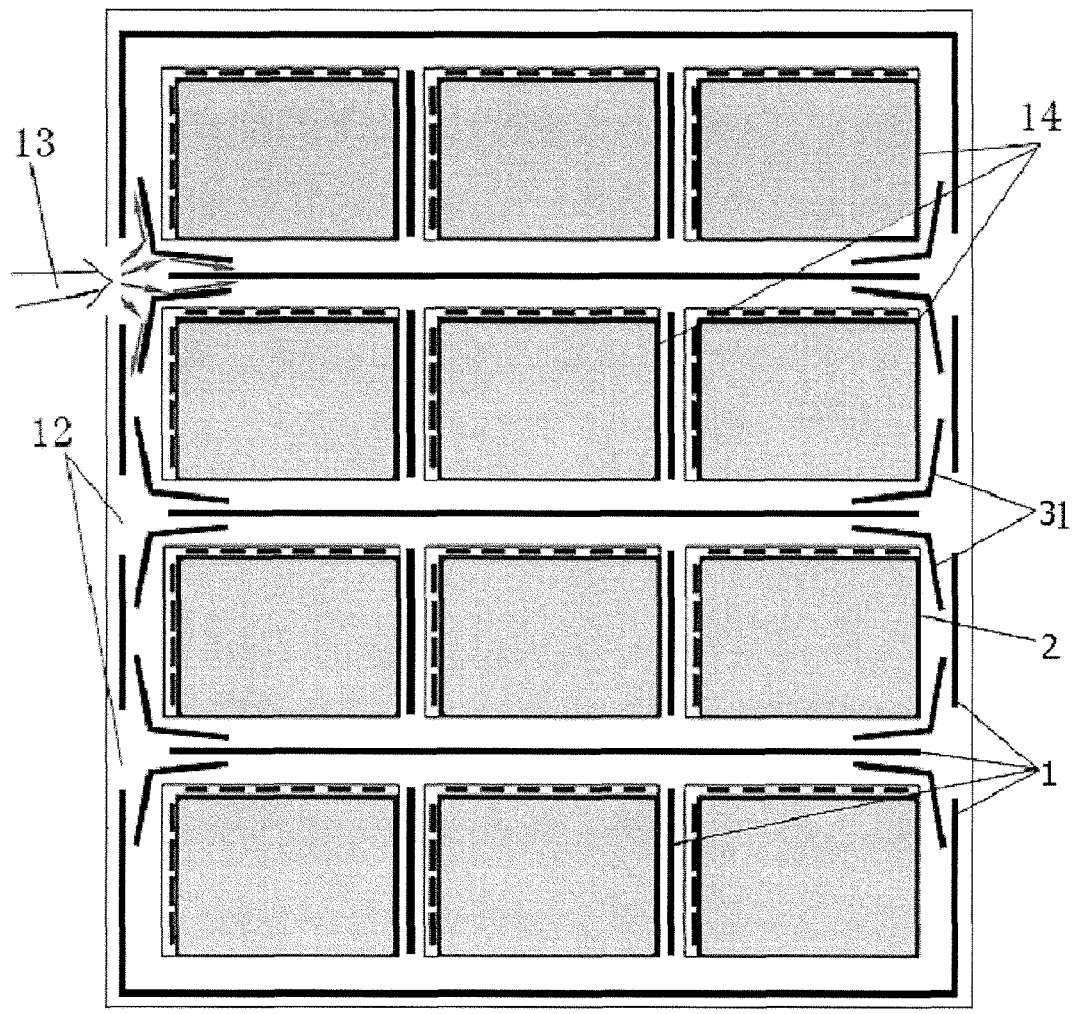
FIG. 11 is a schematic view showing an example of a panel after the assembling process according to the second embodiment of the present invention.

As shown in FIG. 9 to FIG. 11, the assembled panel according to the present embodiment of the invention comprises a TFT array substrate 11 comprising at least one individual panel region 142, a color filter substrate 10 comprising at least one individual panel region 141, a liquid crystal layer enclosed between the individual panel region 142 of the TFT array substrate 11 and the individual panel region 141 of the color filter substrate 10, a subsidiary sealant member 1 provided on the periphery of the individual panel region 142 of the TFT array substrate 11 and the periphery of the individual panel region 141 of the color filter substrate 10 and having at least one opening region 12, and at least one buffer 31 provided on the TFT array substrate 11 or the color filter substrate 10 and corresponding to the opening region 12. Preferably, the hardness of the buffer 31 is larger than that of the subsidiary sealant member 1.

As shown in FIG. 9 and FIG. 10, during the assembling process, the subsidiary sealant member 1 is firstly applied on the TFT array substrate 11 and then the TFT array substrate 11 is bonded with the color filter substrate 10; alternatively, the subsidiary sealant member 1 is firstly applied on the color filter substrate 10 and then the color filter substrate 10 is bonded with the TFT array substrate 11.

In the assembled panel, the buffer provided on the TFT array substrate or the color filter substrate corresponds to the opening region of the subsidiary sealant member and the hardness of the buffer is larger than that of the subsidiary sealant member, and thus the airflow entering through the opening region of the subsidiary sealant member after the panel is exposed to the atmosphere is effectively buffered, and the impact force from the airflow is decreased. Therefore, a degraded display quality due to bubbles resulting from the damage or breakage of the sealant member by the impact force of the airflow can be prevented, and thus the yield of the liquid crystal display is improved. Therefore, with the assembled panel provided in the present embodiment, the problem in the conventional panel that the display quality is degraded due to the bubbles causing by the impact of the airflow can be solved.

Figure 12:
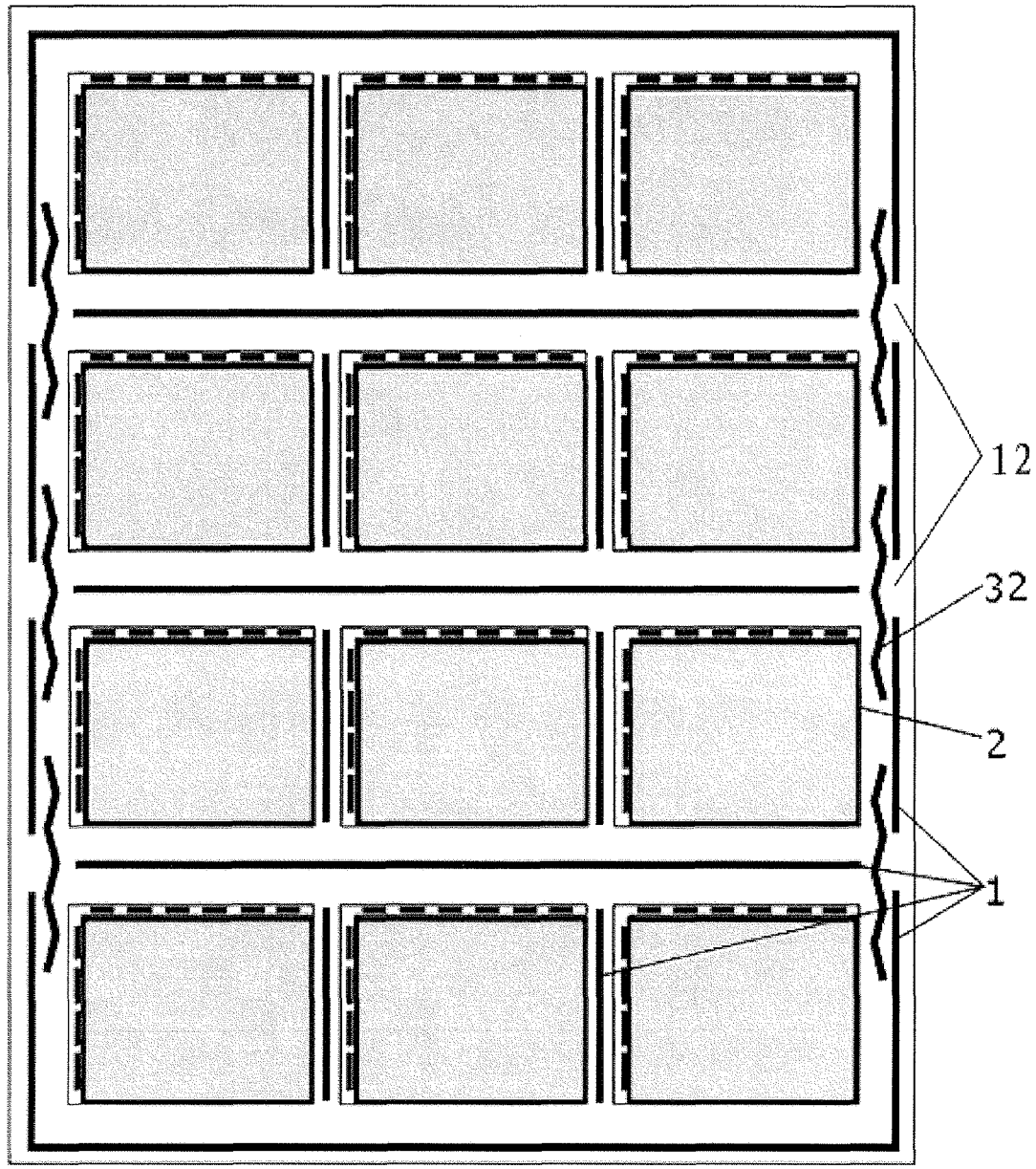
FIG. 12 is a schematic view showing another example of a panel after the assembling process according to the second embodiment of the present invention.
Figure 13:
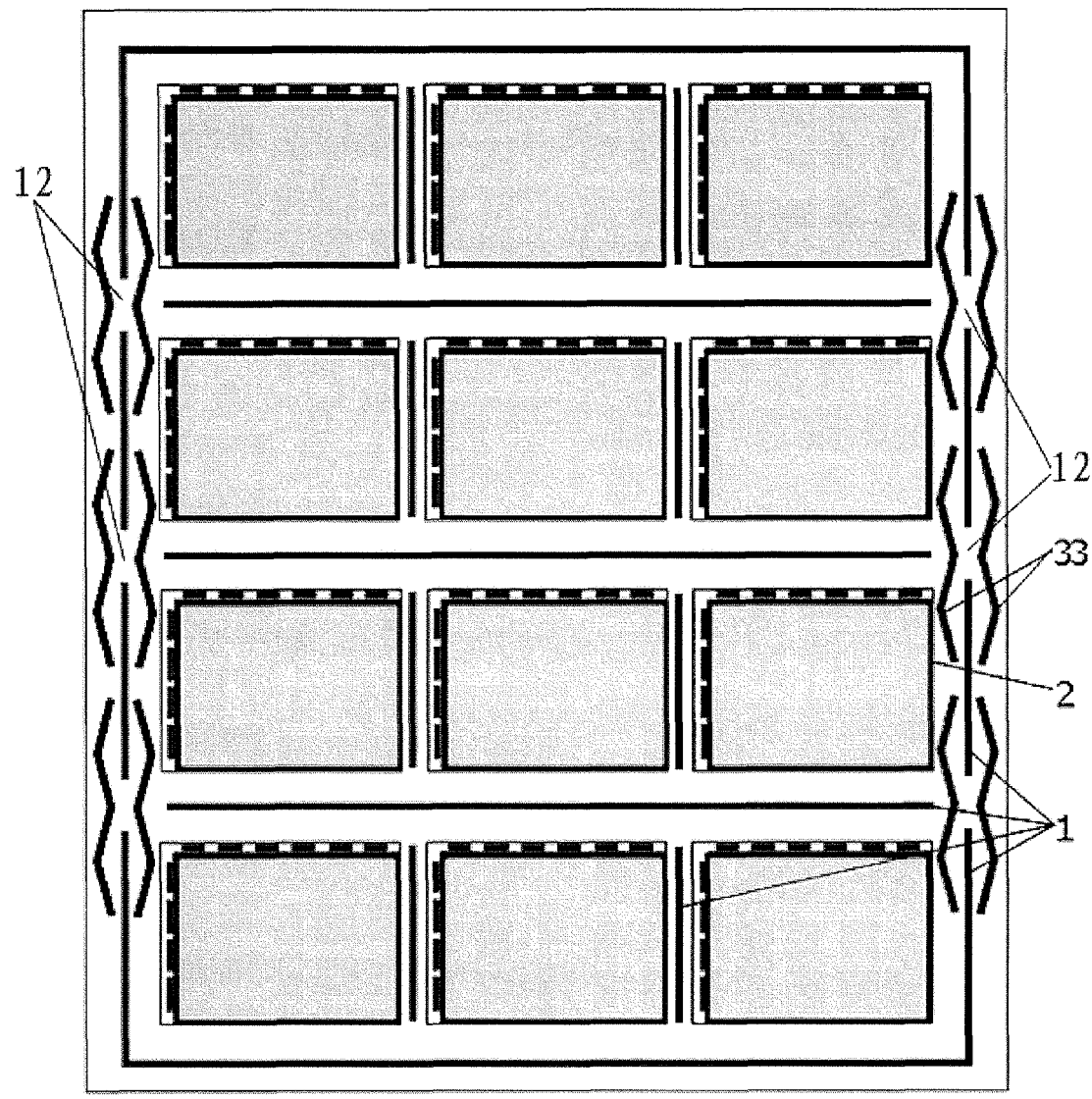
FIG. 13 is a schematic view showing still another example of a panel after the assembling process according to the second embodiment of the present invention.
Figure 14:
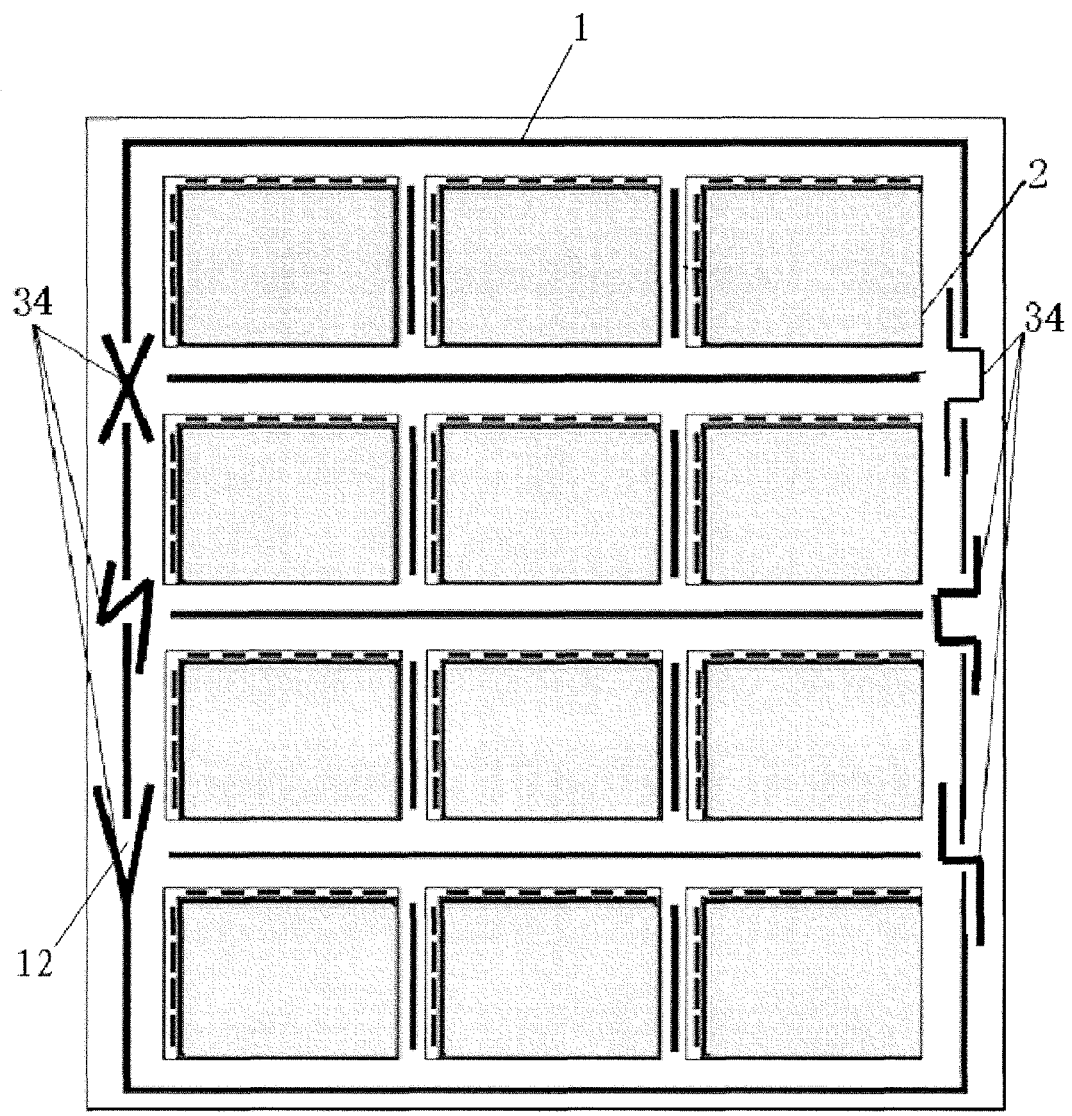
FIG. 14 is a schematic view showing still another example of a panel after the assembling process according to the second embodiment of the present invention.
Figure 15:
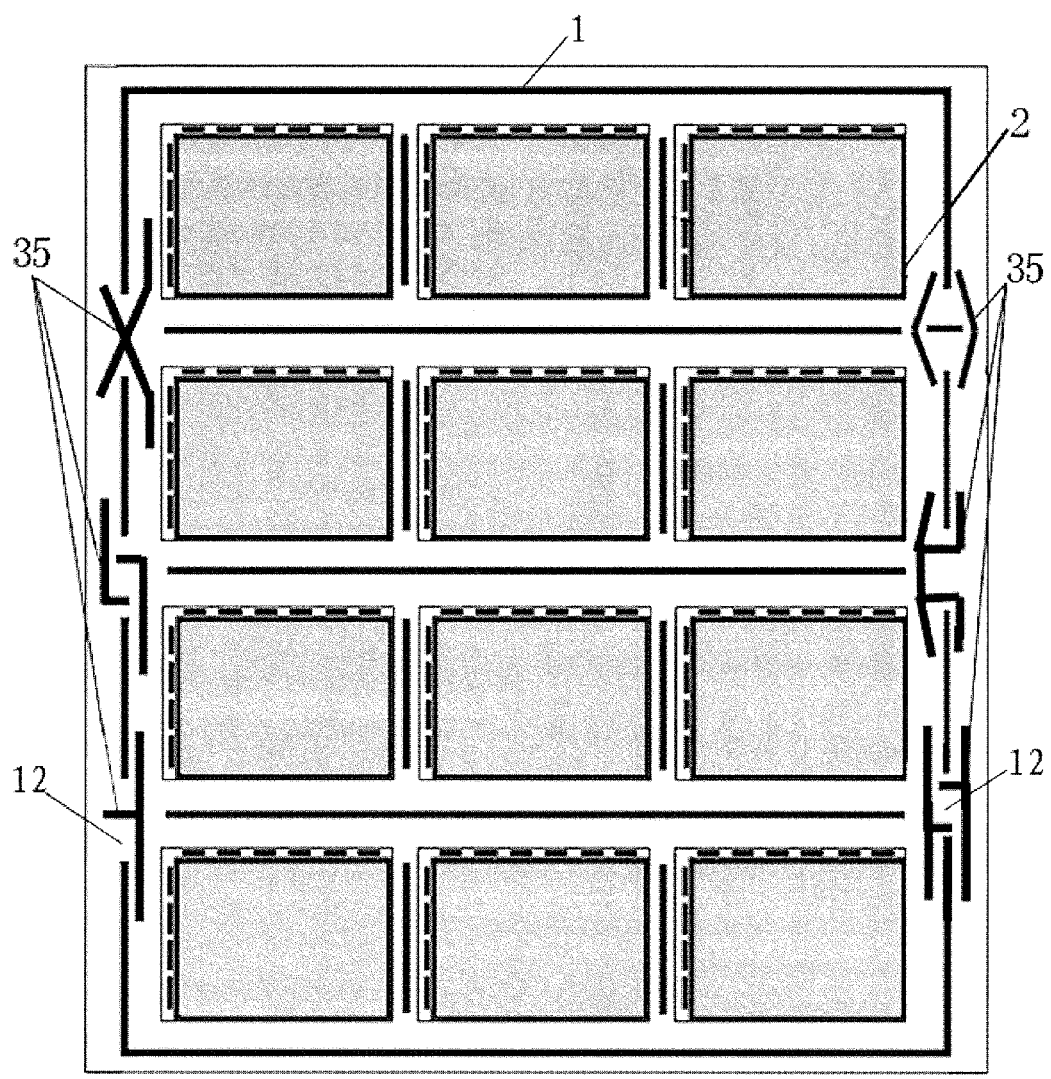
FIG. 15 is a schematic view showing still another example of a panel after the assembling process according to the second embodiment of the present invention.

As shown in FIG. 11 and FIG. 12, buffers 31, 32 are provided on the inside of the opening regions 12; as shown in FIG. 13, buffers 33 also are provided on the outside of the opening regions 12. In addition, the buffers 33 may be further provided on the substrate on the inside and outside of the opening regions 12 and the lateral size of the buffers 33 is larger than the size of the opening regions 12, as shown in FIG. 13. In addition, as shown in FIG. 14 and FIG. 15, buffers 34, 35 are provided extending through the opening regions 12. The widths at the bottom of the buffers 31, 32, 33 are set as about $1/20$~$1/3$ of the distance between the position of the subsidiary sealant member 1 and the position of the primary sealant member 2. By this way, the attachment between the bottom of the buffer and the substrate can be reliably realized, and the area of the substrate can be effectively utilized as well. In addition, the profile of the top of the buffer can be in a shape of circular arc or parabola, and preferably circular arc or parabola with a peak away from the bottom of the buffer. With the reduced contact area between the top of the buffer and the substrate, the number of the supports to the substrates is reduced so that the substrates are mainly supported by the spacers provided on the TFT array substrate 11 or the color filter substrate 10. Therefore, a more uniform cell thickness can be obtained and maintained.

As shown in FIG. 11 and FIG. 12, the buffers 31, 32 are formed in a strip shape and the lateral size thereof is larger than the size of the opening regions 12, and thus the airflows 13 entering through the opening regions 12 can be effectively blocked and buffered as shown in FIG. 11. As shown in FIG. 9 or FIG. 10, spacers are further provided on the TFT array substrate 11 or on the color filter substrate 10. The height of the buffers 31, 32 are larger than that of the spacers, and the buffers 31, 32 are formed of the same material as that of the spacers. Furthermore, the material employed by the spacers has a relatively high hardness and mechanical stability and is widely used in the field of liquid crystal display.

The buffers 32 in FIG. 12, the buffers 33 in FIG. 13, the buffers 34 in FIG. 14 and the buffers 35 in FIG. 15 are formed in a form of a curve line, a fold line, a straight line or a combination thereof, and preferably formed as a fold line with an obtuse angle as shown in FIG. 11. In the buffers 31 shown in FIG. 11, the peaks of the obtuse angles confront the opening regions 12, and thus the airflows 13 entering through the opening regions 12 are even divided into two branches on the both sides of the buffers 31. Therefore, the impact force of the airflows 13 is greatly reduced, and the degraded display quality due to bubbles resulting from the damage or breakage of the sealant by the impact force of the airflow is effectively prevented.

With the assembled panel provided in the present embodiment, the impact force of the airflows is reduced during the manufacturing process and the degraded display quality due to bubbles resulting from the damage or breakage of the sealant is prevented, and thus the assembled panel can be used to manufacture the individual display panel with a high yield and further to manufacture the liquid crystal display with a high yield.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. An assembled panel, comprising:
   a thin film transistor (TFT) array substrate comprising at least one individual panel region;
   a color filter substrate comprising at least one individual panel region;
   a primary sealant member provided along the edges of each of the at least one individual panel region;
   a liquid crystal layer provided between the individual panel region of the TFT array substrate and the individual panel region of the color filter substrate;
   a subsidiary sealant member provided on the periphery of the individual panel region of the TFT array substrate and that of the individual panel region of the color filter substrate and provided with at least one opening region; and
   a buffer provided on the TFT array substrate or on the color filter substrate and corresponding to the opening region,
   wherein the buffer is spaced apart from the subsidiary sealant member;
   wherein spacers are provided on the TFT array substrate or the color filter, and the subsidiary sealant member and the spacers are formed of a same material; and
   wherein the hardness of the buffer being larger than that of the subsidiary sealant member.

2. The assembled panel according to claim 1, wherein the buffer is provided on the inside and/or outside of the opening region of the subsidiary sealant member.

3. The assembled panel according to claim 1, wherein the buffer is provided extending through the opening region of the subsidiary sealant member.

4. The assembled panel according to claim 1, wherein a lateral size of the buffer is larger than an aperture size of the opening region of the subsidiary sealant member.

5. The assembled panel according to claim 1, wherein the height of the buffer is larger than that of the spacers.

6. The assembled panel according to claim 5, wherein the buffer and the spacers are formed of a same material.

7. The assembled panel according to claim 1, wherein the buffer is formed as one of a curve line, a fold line, a straight line and any combination thereof.

8. The assembled panel according to claim 1, wherein a width at the bottom of the buffer is about $1/20 \sim 1/3$ of the distance between a position of the subsidiary sealant member and a position of a primary sealant member.

9. The assembled panel according to claim 1, wherein a profile of the top of the buffer is shaped as a circular arc or parabola.

* * * * *